United States Patent
Kobayashi et al.

(10) Patent No.: US 9,391,485 B2
(45) Date of Patent: Jul. 12, 2016

(54) INVERTER TERMINAL BOARD INSTALLED IN MOTOR CASE AND PACKING

(75) Inventors: Masaki Kobayashi, Makinohara (JP); Kenichi Okamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 175 days.

(21) Appl. No.: 13/254,224

(22) PCT Filed: Nov. 5, 2010

(86) PCT No.: PCT/JP2010/069758
§ 371 (c)(1),
(2), (4) Date: Sep. 1, 2011

(87) PCT Pub. No.: WO2011/055807
PCT Pub. Date: May 12, 2011

(65) Prior Publication Data
US 2011/0316372 A1    Dec. 29, 2011

(30) Foreign Application Priority Data

Nov. 6, 2009  (JP) .................................. 2009-255288

(51) Int. Cl.
*H02K 11/00*    (2016.01)
*H02K 5/22*    (2006.01)
(Continued)

(52) U.S. Cl.
CPC .................. *H02K 5/225* (2013.01); *H01R 9/24* (2013.01); *H01R 13/521* (2013.01); *H02K 11/33* (2016.01); *H01R 11/12* (2013.01); *H01R 2201/26* (2013.01)

(58) Field of Classification Search
CPC ........ H01R 9/24; H01R 13/521; H01R 11/12; H01R 2201/26; H02K 11/0073; H02K 5/225

USPC .............................................. 310/71; 439/382
See application file for complete search history.

(56) References Cited

U.S. PATENT DOCUMENTS 5,517,401 A    5/1996  Kinoshita et al.
5,814,909 A *  9/1998  Yamada et al. ................. 310/64
(Continued)

FOREIGN PATENT DOCUMENTS

JP      62201480 U  * 12/1987
JP      5-219607 A    8/1993
(Continued)

OTHER PUBLICATIONS

Translation of foreign document JP 2005002949 A (Year 2005).*
(Continued)

*Primary Examiner* — Alex W Mok
(74) *Attorney, Agent, or Firm* — Sughrue Mion, PLLC (57) ABSTRACT

An inverter terminal board and packing capable of performing a packing function even when variations due to assembly tolerances of a motor and an inverter are great and large relative movement occurs between the inverter and the motor are provided. In an inverter terminal board 10 including an electric conductor 20 which has an inverter side connecting terminal 20T attached to a case of a motor and a connector terminal 20C for supplying power to a power receiving terminal of the motor and is made by connecting the connecting terminal 20T to the connector terminal 20C, the inverter terminal board in which the connector terminal 20C has a flat plate shape and packing 30 is attached over the entire periphery of the connector terminal 20C, a wall thickness of a portion abutting on a flat plate side of the flat plate-shaped terminal in the entire periphery of the packing 30 is made thicker than a wall thickness of the other portion.

3 Claims, 10 Drawing Sheets

(51) Int. Cl.
*H01R 9/24* (2006.01)
*H01R 13/52* (2006.01)
*H01R 11/12* (2006.01)

(56) References Cited

U.S. PATENT DOCUMENTS

| | | | | |
|---|---|---|---|---|
| 6,341,984 | B1* | 1/2002 | Murakami | H01R 13/5208 439/587 |
| 6,383,021 | B1* | 5/2002 | Murakami | H01R 13/5208 439/489 |
| 7,059,918 | B2* | 6/2006 | Matsumoto et al. | 439/752 |
| 7,588,449 | B2* | 9/2009 | Takehara | 439/247 |
| 7,749,010 | B2* | 7/2010 | Takehara | 439/247 |
| 2002/0052140 | A1* | 5/2002 | Hara et al. | 439/587 |
| 2002/0052143 | A1* | 5/2002 | Hara et al. | 439/606 |
| 2004/0195016 | A1 | 10/2004 | Shimizu et al. | |
| 2006/0108884 | A1* | 5/2006 | Shiino et al. | 310/89 |
| 2006/0138883 | A1* | 6/2006 | Yagai et al. | 310/71 |
| 2007/0128907 | A1* | 6/2007 | Sakamoto et al. | 439/180 |
| 2007/0218747 | A1* | 9/2007 | Takehara | 439/382 |
| 2008/0211331 | A1* | 9/2008 | Dubuc et al. | 310/71 |
| 2009/0108688 | A1* | 4/2009 | Miura | 310/71 |
| 2009/0256437 | A1* | 10/2009 | Miura et al. | 310/71 |
| 2009/0291586 | A1 | 11/2009 | Takehara | |
| 2010/0018243 | A1* | 1/2010 | Tanaka et al. | 62/508 |

FOREIGN PATENT DOCUMENTS

| | | | |
|---|---|---|---|
| JP | 09106852 | A * | 4/1997 |
| JP | 2004-312853 | A | 11/2004 |
| JP | 2005-002949 | A | 1/2005 |
| JP | 2007-127153 | A | 5/2007 |
| JP | 2007-244025 | A | 9/2007 |
| JP | 2007-280913 | A | 10/2007 |
| JP | 2008-130388 | A | 6/2008 |

OTHER PUBLICATIONS

Translation of foreign document JP 2007127153 A (Year 2007).*
Translation of foreign document JP 2008130388 A (Year 2008).*
International Search Report for PCT/JP2010/069758, dated Dec. 21, 2010 [PCT/ISA/210].
Written Opinion for PCT/JP2010/069758 dated Dec. 21, 2010 [PCT/ISA/237].
Office Action dated Dec. 12, 2013 issued by the Patent Office of the People's Republic of China in counterpart Chinese Patent Application No. 201080012869.8.

* cited by examiner

SEC. A-A　　　　　　SEC. B-B
(A)　　　　　　　　(B)

INVERTER TERMINAL BOARD INSTALLED IN MOTOR CASE AND PACKING

TECHNICAL FIELD

The present invention relates to a suitable inverter terminal board unaffected by vibration under an environment of occurrence of the vibration in the case of installing an inverter used for a vehicle etc. in a motor case, and particularly to a shape of packing used in the inverter terminal board.

BACKGROUND ART

An electric vehicle or a hybrid electric vehicle generally includes a motor and an inverter between a battery and wheels in order to drive the wheels by electric power accumulated in the battery.

The electric power accumulated in the battery is converted by the inverter of an inverter device etc. and is supplied to the motor and rotates the motor, and rotation of the motor is transmitted to the wheels and drives the wheels.

Conventionally, the inverter and the motor were mounted in separate places of the vehicle and a terminal of the inverter was connected to a terminal of the motor using a wire harness.

On the other hand, a structure of integrating an inverter with a motor for the purpose of cost reduction and miniaturization of an electric driving system from a battery to wheels has been proposed recently (Patent Reference 1 or 2).

<Invention Described in Patent Reference 1 or 2>

Figure 11:
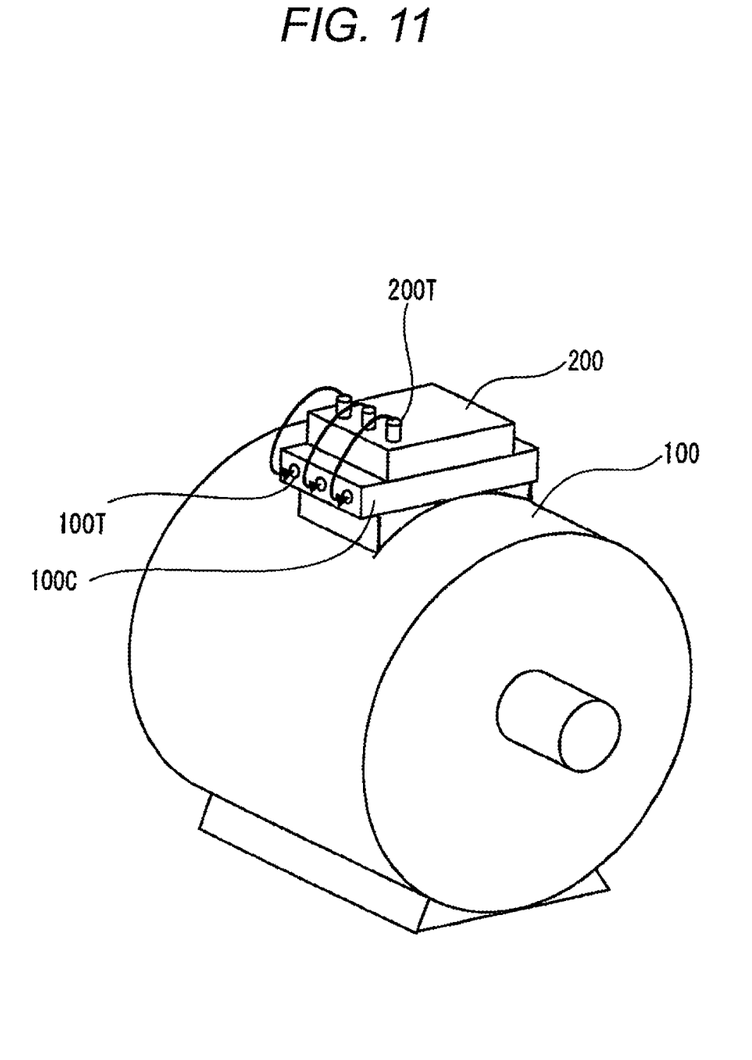
FIG. 11 is a conceptual diagram of an invention of integrating an inverter with a motor described in Patent Reference 1 or 2.

FIG. 11 is a conceptual diagram of an invention of integrating an inverter with a motor described in Patent Reference 1 or 2, and a power receiving box 100C is placed on a motor case 100 for accommodating a three-phase AC motor (an induction motor or a synchronous machine) and motor side terminals 100T for receiving three-phase AC electric power are attached to the power receiving box 100C and on the other hand, output terminals 200T of an inverter 200 for receiving a DC from a DC power source placed on the other part of a vehicle and converting the DC into an three-phase AC are attached. Then, a vibration-resistant connector targeted for the invention is used for supplying the three-phase AC electric power of the inverter 200 from the output terminals 200T to the motor side terminals 100T of the power receiving box 100C of the side of the motor case 100.

<Merit of Invention Described in Patent Reference 1 or 2>

After the motor case 100 and the inverter 200 are assembled separately, the inverter 200 is installed in the vicinity of the motor case 100 and also the output terminals 200T of the inverter 200 are connected to the motor side terminals 100T of the motor case 100 by the connector and thereby, the inverter 200 and the motor case 100 can be assembled and manufactured as separate modules and are only connected by the connector at the time of integration, so that manufacture is easy and cost can be reduced.

<Demerit of Invention Described in Patent Reference 1 or 2>

However, in such a configuration, a vibration phase difference between the inverter and the motor by vibration of the motor itself or vibration of a vehicle body at the time of driving is applied to the connector and the connector may be damaged. Therefore, it is necessary to develop a connector capable of withstanding such vibration.

Then, a connector described in Patent Reference 3 is disclosed as the connector capable of withstanding such vibration.

PRIOR ART REFERENCE

Patent Reference

Patent Reference 1: JP-A-5-219607
Patent Reference 2: JP-A-2004-312853
Patent Reference 3: JP-A-2007-280913

<Configuration of Connector Described in Patent Reference 3>

The connector described in Patent Reference 3 is characterized in that in the connector for connecting an inverter terminal to a motor terminal, an inverter cabinet and the inverter terminal and a motor cabinet and the motor terminal are included and while the motor terminal is fixed and attached to the motor cabinet, the inverter terminal is attached to the inverter cabinet through a vibration absorber.

<Merit of Connector Described in Patent Reference 3>

Since the terminal of one device is attached to the cabinet of its device through the vibration absorber thus, even when vibration by a phase difference is applied to one device and the other device, its vibration is absorbed by the vibration absorber, so that an extra load is not applied to a connector connection and adverse influences of damage etc. can be prevented.

DISCLOSURE OF THE INVENTION

Problems that the Invention is to Solve

<Problem of Connector Described in Patent Reference 3>

However, the connector described in Patent Reference 3 does not have a waterproof structure at the time of absorption in the case of variations due to assembly tolerances of a motor and an inverter. Therefore, when vibration varies greatly in the case of great variations due to the assembly tolerances of the motor and the inverter even when the vibration absorber is included, the vibration cannot be prevented sufficiently and even when packing is received in the inside, its packing does not function and waterproof properties are insufficient.

Object of the Invention

The invention has been implemented in order to solve the problem described above, and an object of the invention is to provide packing capable of sufficiently exerting a sealing effect on vibration even in the case of great variations due to assembly tolerances of a motor and an inverter, and therefore is to provide an inverter terminal board with good waterproof properties using the packing.

Means for Solving the Problems

In order to solve the problem described above, a first invention of the present application is an inverter terminal board including an electric conductor which has an inverter side connecting terminal connected to an output terminal of an inverter attached to a case of a motor and a connector terminal for supplying power to a power receiving terminal of the motor and is made by connecting the inverter side connecting terminal to the connector terminal, the inverter terminal board in which the connector terminal has a flat plate shape and packing is attached over the entire periphery of the connector terminal, and is characterized in that a wall thickness of a portion abutting on a flat plate side of the flat plate-shaped terminal in the entire periphery of the packing is made thicker than a wall thickness of the other portion.

Also, in the first invention, a second invention is characterized in that in the packing, two or more chevron parts are formed in longitudinal sectional view.

Also, in the first invention, a third invention is characterized in that both ends of the packing attached to the connector terminal are provided with spacers.

Also, a fourth invention is packing for an inverter terminal board, the packing whose external shape is an oval cylindrical shape, and is characterized in that in packing for a connector terminal, including a through hole passing through the center of the oval cylinder and extending in a long axis direction, a wall thickness of a packing portion of a surface parallel to a long axis side in the entire periphery of the packing is made thicker than a wall thickness of a portion of the other surface.

Advantage of the Invention

According to the first invention as described above, the packing capable of sufficiently exerting a sealing effect on vibration even in the case of great variations due to assembly tolerances of the motor and the inverter can be obtained.

According to the second invention, the packing has elasticity by the two chevron parts and can obtain a long stroke of deformation and can also fit stably. The packing capable of sufficiently exerting the sealing effect on vibration can be obtained.

According to the third invention, even at the time of large vibration, the connector terminal can maintain a vertical state, so that the sealing effect on the vibration can be exerted sufficiently.

According to the fourth invention, even when large relative movement occurs between the inverter and the motor, the sufficiently thick thick-wall portion of the packing compensates for the amount of relative movement, so that a packing function can be performed still, and large vibration does not occur in the other directions by verification of the invention, with the result that the thin-wall portion will suffice. Therefore, secondary effects in which an apparatus does not grow in size and resource saving is achieved and workability in the case of attaching the packing to the connector terminal does not reduce can be obtained.

BRIEF DESCRIPTION OF THE DRAWINGS

Both FIGS. 1(A) and 1(B) construct an exploded perspective view of an inverter terminal board to which the invention is applied.

FIGS. 4(A) and 4(B) are diagrams describing packing according to the invention.

FIGS. 5(A) and 5(B) are diagrams describing a sectional shape of the packing shown in FIGS. 4(A) and 4(B)

FIGS. 7(A) to 7(C) are sectional views describing a function of packing, FIG. 7(A) shows the original shape of the normal packing by representing lip parts of the packing in a state in which an external force is not applied to an inner peripheral surface of the inverter terminal board intentionally by dotted lines. That is, note that use of the dotted lines in the lip parts of the packing does not indicate that the packing bites into the inverter terminal board.

FIGS. 10(A) and 10(B) are sectional views describing a function of the upper and lower spacers of FIG. 9, FIG. 10(A) shows the original shape of the normal packing by representing lip parts of the packing in a state in which an external force is not applied to an inner peripheral surface of the inverter terminal board intentionally by dotted lines. That is, note that use of the dotted lines in the lip parts of the packing does not indicate that the packing bites into the inverter terminal board.

MODE FOR CARRYING OUT THE INVENTION

First and second embodiments of packing of the invention capable of sufficiently exerting a sealing effect on vibration even in the case of great variations due to assembly tolerances of a motor and an inverter will hereinafter be described based on the drawings.

First Embodiment

Inverter Terminal Board to which the Invention is Applied

First, an inverter terminal board to which the invention is applied will be described on the premise that a first embodiment of the invention is described.

Figure 1:
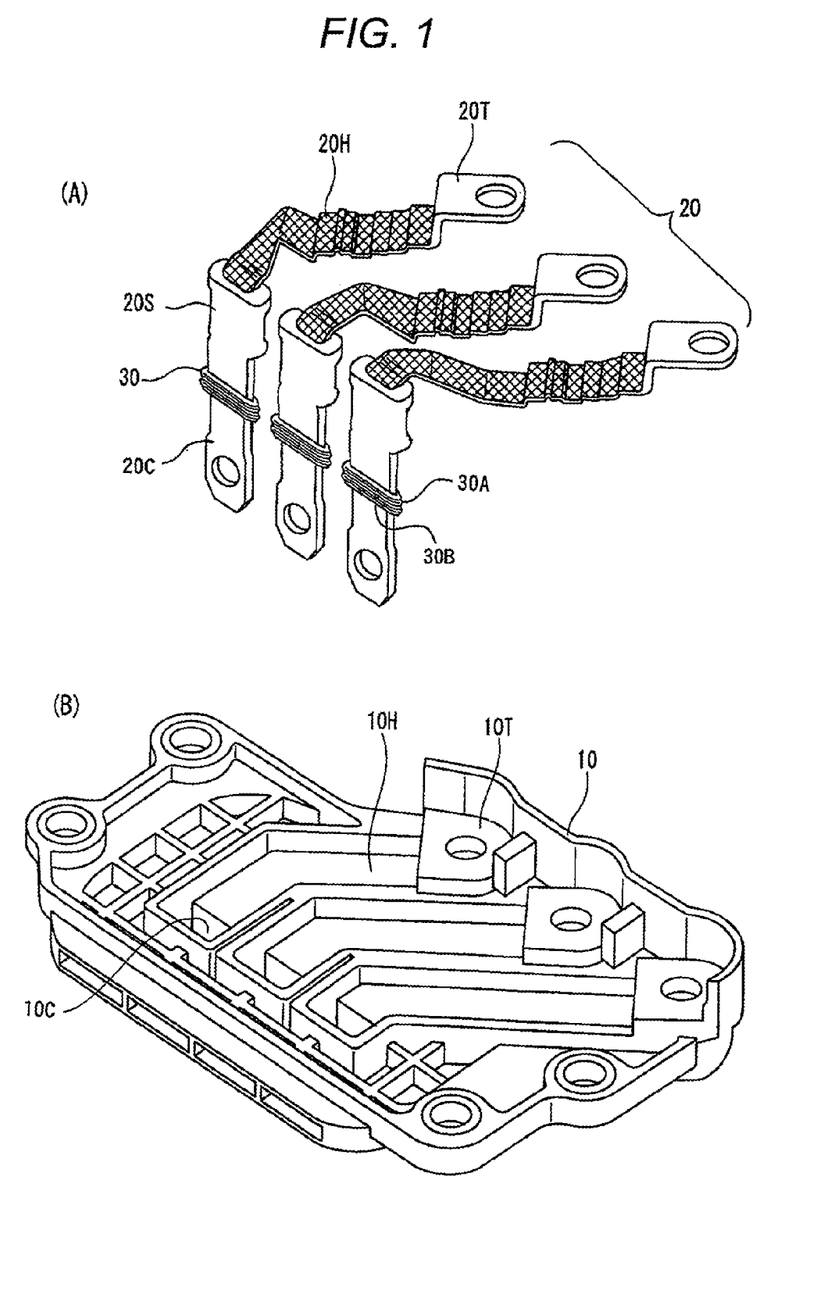
FIG. 1(A) shows an electric conductor using a braid of the inverter side.
FIG. 1(B) shows the inverter terminal board for receiving the electric conductor of FIG. 1(A).

Both FIGS. 1(A) and 1(B) construct an exploded perspective view of an inverter terminal board to which the invention is applied, and FIG. 1(A) shows an electric conductor using a braid of the inverter side, and FIG. 1(B) shows the inverter terminal board for receiving the electric conductor of FIG. 1(A).

In FIG. 1(A), electric conductors 20 are the electric conductors of three systems for supplying an AC three-phase current produced in the inverter side to the motor side, and each of the electric conductors includes an inverter side connecting terminal 20T, a braid 20H whose one end is connected to the inverter side connecting terminal 20T, and a connector terminal 20C having a caulked part 20S in which the other end of the braid 20H is caulked. Since the flexible braid 20H is interposed between the inverter side connecting terminal 20T and the connector terminal 20C, unlike intervention of a bus bar, vibration applied to the inverter side connecting terminal 20T is not transmitted to the connector terminal 20C.

Then, packing 30 (described below) according to the invention for surrounding the connector terminal 20C is attached to the connector terminal 20C.

In FIG. 1(B), an inverter terminal board 10 is a container in which the whole for respectively receiving the electric conductors 20 of three systems is molded of synthetic resin, and is provided with terminal receiving parts 10T for respectively receiving the inverter side connecting terminals 20T of the electric conductors 20 of three systems, braid receiving parts 10H for respectively receiving the braids 20H of three systems, and connector terminal insertion ports 100 (not seen in the drawing) into which the connector terminals 200 are inserted.

Figure 2:
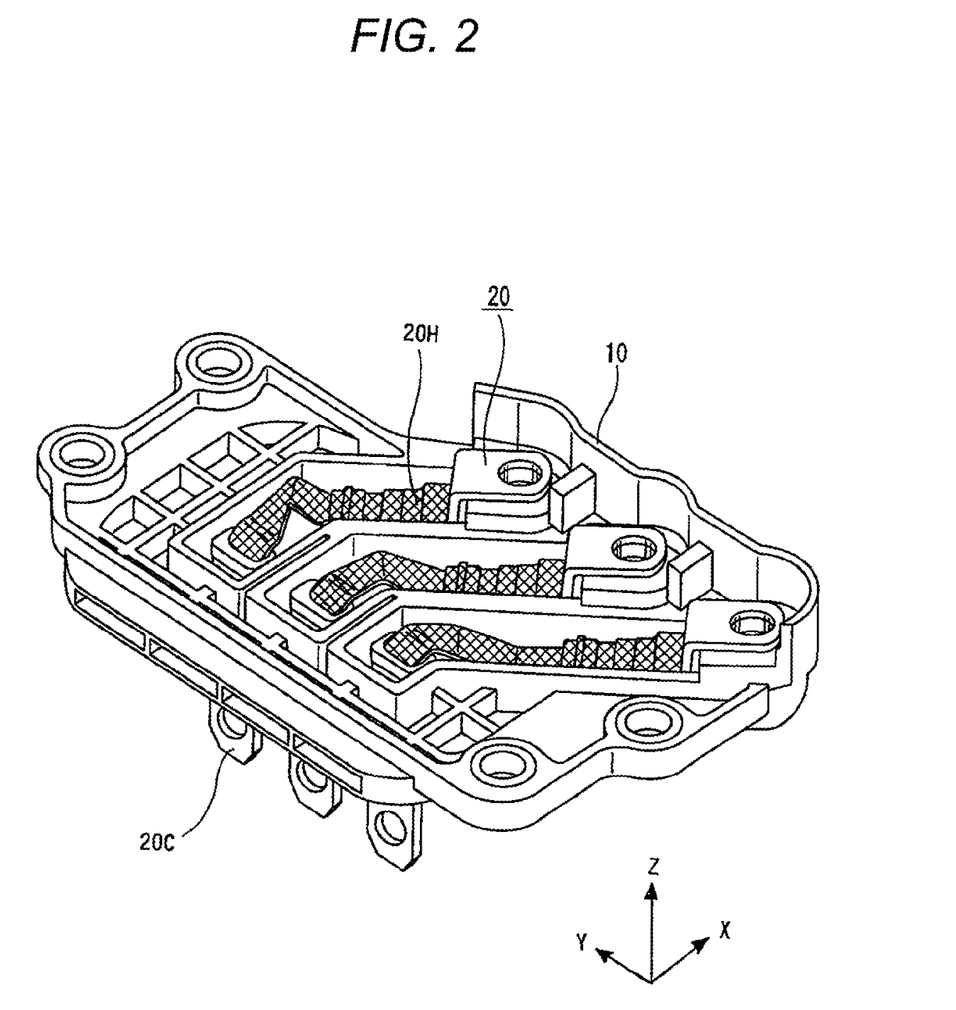
FIG. 2 is a perspective view of a state of receiving the electric conductor of FIG. 1(A) in the inverter terminal board of FIG. 1(B).

FIG. 2 is a perspective view of a state of receiving the electric conductors 20 in the inverter terminal board 10 of FIG. 1(B). In FIG. 2, the inverter side connecting terminal 20T (FIG. 1(A)) of the electric conductor 20 is placed on the terminal receiving part 10T (FIG. 1(B)) and the braid 20H is placed on the braid receiving part 10H (FIG. 1(B)) and then, the connector terminal 20C inserted into the connector terminal insertion port 100 (FIG. 1(B)) protrudes from a lower portion of the inverter terminal board 10. This connector terminal 20C is attached to the motor side terminal 100T of the power receiving box 100C of the other motor case 100 (FIG. 11) with a bolt.

Figure 3:
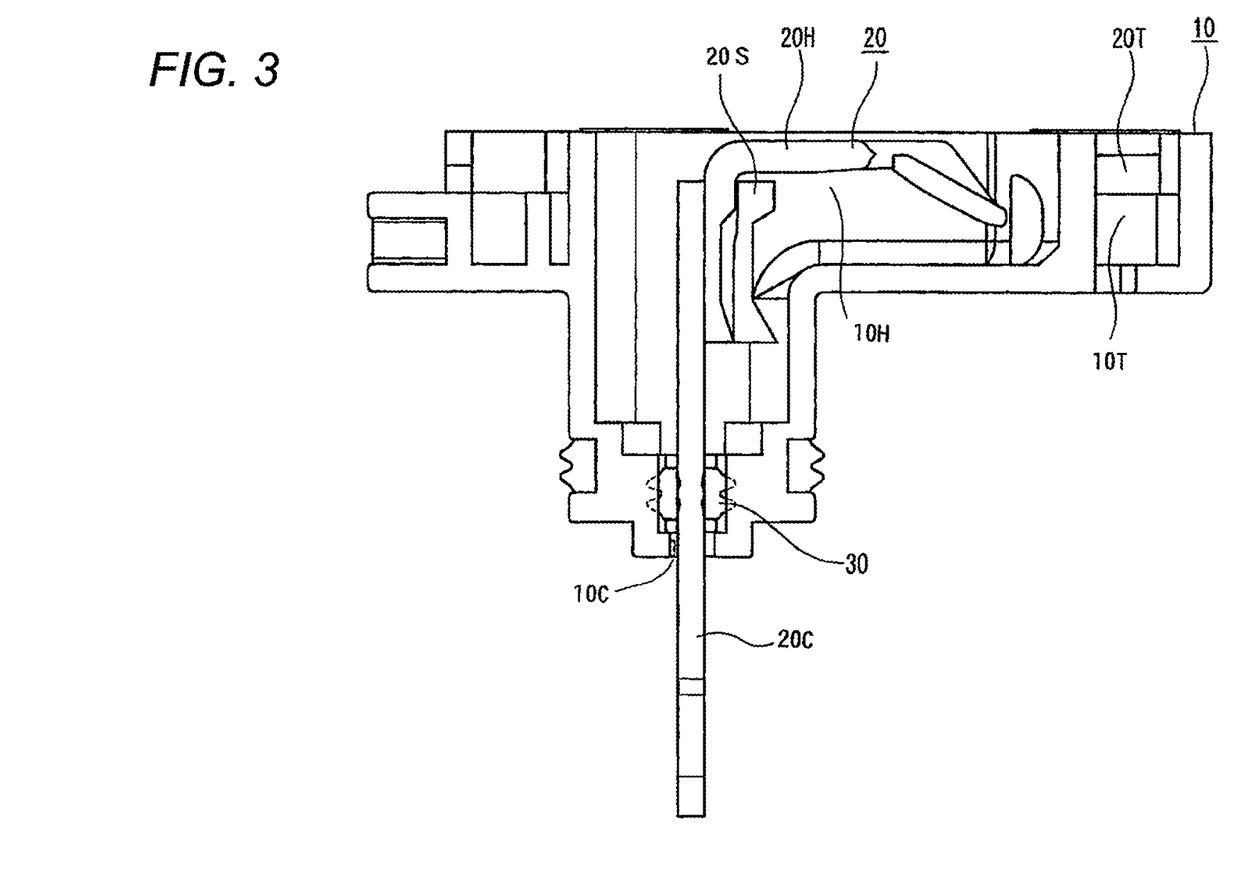
FIG. 3 is a longitudinal sectional view showing the state of FIG. 2 in which the electric conductor is attached to the inverter terminal board.

FIG. 3 is a longitudinal sectional view showing the state of FIG. 2 in which the electric conductor 20 is attached to the inverter terminal board 10. In FIG. 3, the braid 20H of the electric conductor 20 attached to the inverter terminal board 10 is placed on the braid receiving part 10H, and the connector terminal 20C in which the end of the braid 20H is caulked in the caulked part 20S downward protrudes from the inverter terminal board 10.

The vibration-resistant packing 30 (described below) according to the invention is attached to the connector terminal 20C and surrounds the connector terminal 20C.

<Shape of Packing 30 According to the Invention>

Figure 4:
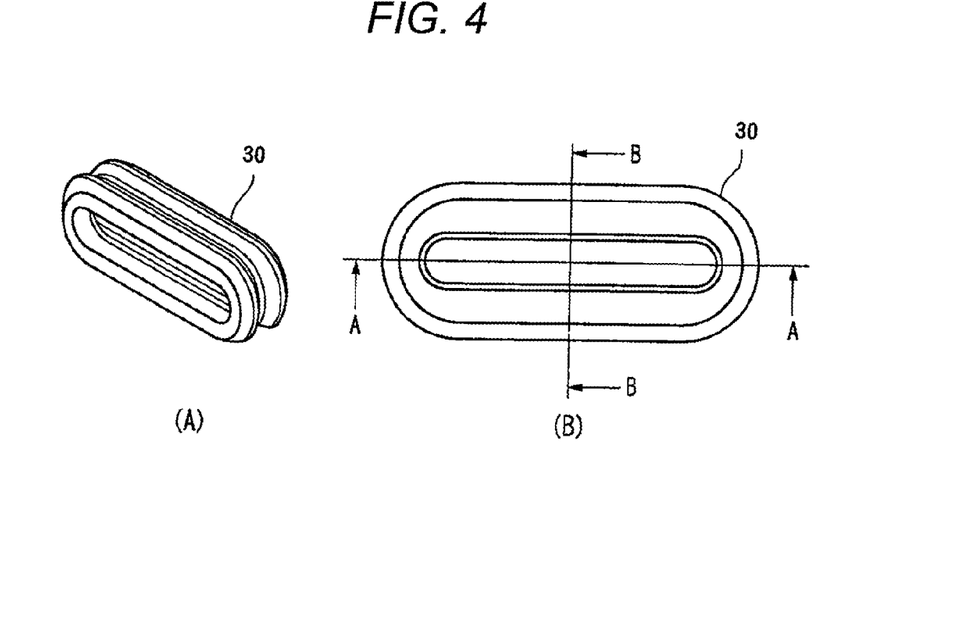
FIG. 4(A) is a perspective view.
FIG. 4(B) is a plan view.
Figure 5:
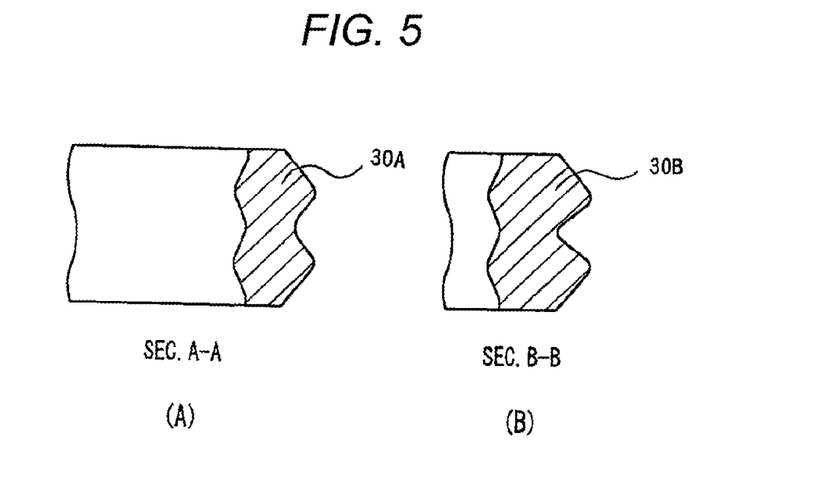
FIG. 5(A) is a sectional view taken on line A-A in FIG. 4(B)
FIG. 5(B) is a sectional view taken on line B-B in FIG. 4(B).

FIGS. 4(A) and 4(B) are diagrams describing the packing 30 according to the invention, and FIG. 4(A) is a perspective view, and FIG. 4(B) is a plan view, and FIGS. 5(A) and 5(B) are diagrams describing a sectional shape of the packing 30 shown in FIGS. 4(A) and 4(B), and FIG. 5(A) is a sectional view taken on line A-A in FIG. 4(B), and FIG. 5(B) is a sectional view taken on line B-B in FIG. 4(B).

The packing 30 according to the invention plays the role of preventing an oil leak from the motor, and is characterized in that a thickness is varied in only one direction unlike conventional packing whose entire periphery has a uniform thickness. A thickness of a cross section 30B of FIG. 5(B) taken on line B-B of FIG. 4(B) is formed as a thick-wall portion thicker than that of a cross section 30A of a thin-wall portion of FIG. 5(A) taken on line A-A of FIG. 4(B). Then, in the packing 30, two chevron parts (lip parts) are formed in longitudinal sectional view of FIGS. 5(A) and 5(B).

The packing 30 has elasticity by these two chevron parts and can obtain a long stroke of deformation and can also fit stably. Here, the two chevron parts are formed over the entire periphery of the packing 30, but for a large installation area, three or more chevron parts can be formed naturally.

<Function of Packing 30 According to the Invention>

Figure 6:
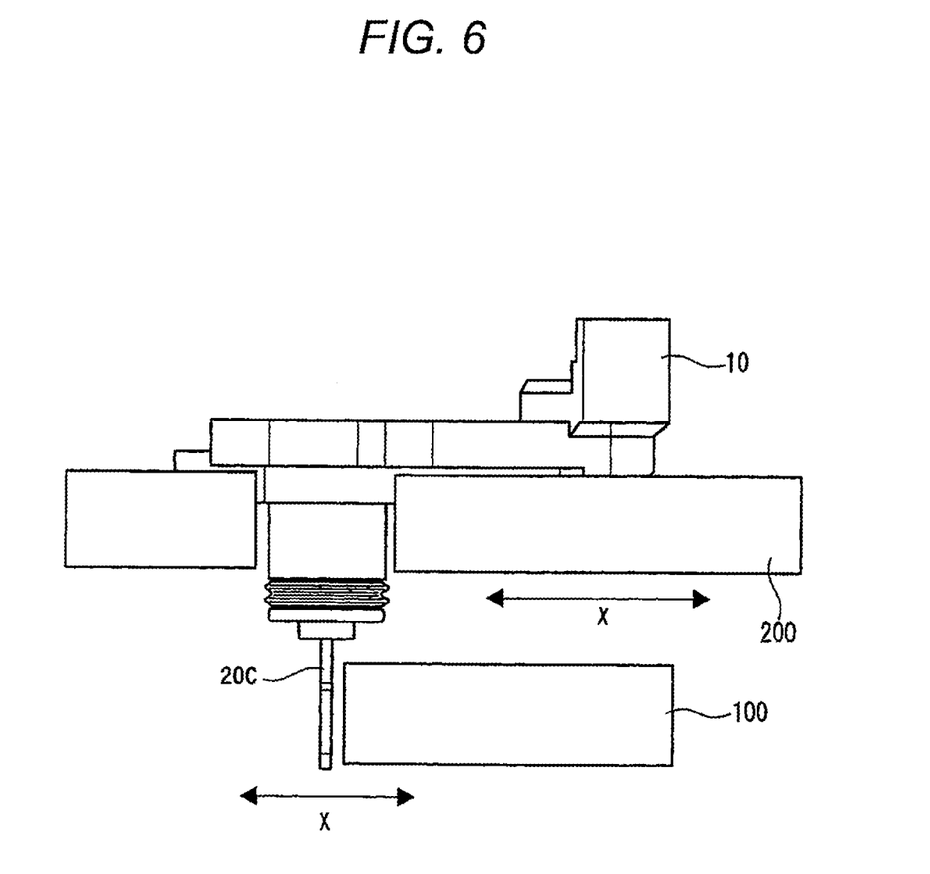
FIG. 6 is a conceptual diagram showing a state of placing the inverter terminal board of an inverter on a motor case.

FIG. 6 is a conceptual diagram showing a state of placing the inverter terminal board 10 of the inverter 200 on the motor case 100, and a thin surface of the connector terminal 20C (FIG. 1(A)) with a thin rectangular flat plate shape is set at the front side. The invention is characterized by sufficiently thickening a thickness of the packing 30 in an X direction by noting that an amplitude of only the X direction is large while amplitudes of Y and Z directions are small when magnitude of vibration applied to the inverter or the motor is shown by the X, Y and Z axes (see FIG. 2) of three dimensions. In FIG. 1(A), each of the connector terminals 20C is provided with such packing 30.

Returning to FIG. 6, large vibration of the X direction is applied to the inverter or the motor and the phase difference occurs between the inverter and the motor and even when relative movement occurs between the inverter and the motor, the sufficiently thick thick-wall portion of the packing 30 compensates for the amount of relative movement by providing the connector terminal 20C with the packing 30 according to the invention, so that a packing function can be performed still.

<Disadvantage of Countermeasure 1 without Using Packing 30 of the Invention>

On the other hand, in conventional existing packing whose entire periphery has a uniform thickness, such sufficient thick-wall portion 30B (FIG. 5(B)) is not formed and all the packing has the thin-wall portion 30A (FIG. 5(A)), so that when the amount of relative movement occurs, the packing does not compensate for the amount of relative movement and the packing is separated from a contact surface and the packing function cannot be performed.

<Disadvantage of Countermeasure 2 without Using Packing 30 of the Invention>

Also, it is easily contemplated to use uniform packing whose entire periphery has only the sufficient thick-wall portion 30B (FIG. 5(B)) and even when the amount of relative movement occurs in this case, the packing is not separated from a contact surface, so that the packing function can be performed, but there are problems that (1) an apparatus grows in size and (2) waste of thicknesses of Y and Z directions runs counter to resource saving and (3) in the case of attaching the packing to a connector terminal, a strong insertion force is required and workability reduces as the biggest problem.

<Conclusion of Packing 30 of the Invention>

Even when variations due to assembly tolerances of the motor and the inverter are great and large relative movement occurs between the inverter and the motor, the sufficiently thick thick-wall portion of the packing 30 compensates for the amount of relative movement by providing the connector terminal 20C with the packing 30 of the invention, so that the packing function can be performed still, and large vibration does not occur in the other directions by verification of the invention, with the result that the thin-wall portion will suffice. Therefore, secondary effects in which the apparatus does not grow in size and the resource saving is achieved and the workability in the case of attaching the packing to the connector terminal does not reduce can be obtained.

Second Embodiment

Problem of First Embodiment

As described above, a packing function is effectively fulfilled with respect to any vibration by using the packing 30 of the invention, but it was revealed that a packing leak occurs only under specific conditions. As a result of pursuing the cause, the specific conditions could be ascertained.

Hence, a problem of the packing 30 of the invention will be described using FIGS. 7(A) to 7(C).

FIGS. 7(A) to 7(C) are sectional views describing the function of the packing 30, and FIG. 7(A) shows a state of the packing 30 at the time of no vibration, and FIG. 7(B) shows a state of the packing 30 at the time when the connector terminal 20C is displaced by vibration while maintaining a vertical state, and FIG. 7(C) represents a deformed state of each packing 30 at the time when the connector terminal 20C is inclined by vibration.

At the time of no vibration of FIG. 7(A), the packing 30 is in contact with a contact surface of the entire periphery, so that the packing function is fulfilled without any problem. At the time of vibration of FIG. 7(B), the connector terminal 20C is displaced while maintaining the vertical state, so that the packing 30 is in contact with the contact surface of the entire periphery as can be seen from the drawing, with the result that the packing function is similarly fulfilled without any problem.

However, when the connector terminal 20C is inclined at the time of vibration as shown FIG. 7(C), a portion of the chevron part is separated from the contact surface in the packing 30, so that it was revealed that the packing function cannot be effectively fulfilled even for the thick-wall packing of the first embodiment.

Second Embodiment

A second embodiment has been implemented in order to solve such a problem of the first embodiment, and is constructed so as to provide both upper and lower ends of packing 30 with an upper spacer 40U and a lower spacer 40S by noticing that the problem described above can be solved by preventing the connector terminal 20C from being inclined as shown FIG. 7(C) even for vibration.

<Spacer of Second Embodiment>

Figure 8:
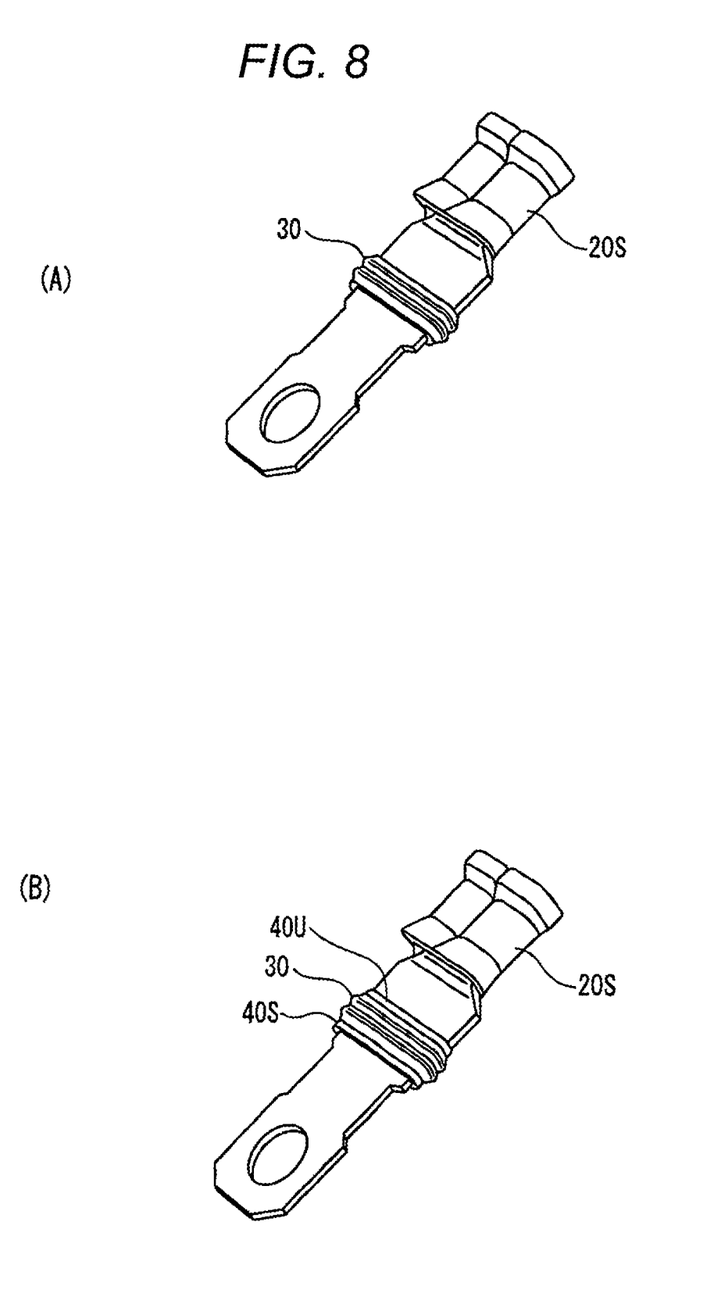
FIG. 8(A) is a perspective view seen from the back side of the connector terminal representing the packing of a first embodiment.
FIG. 8(B) is a perspective view seen from the back side of the connector terminal representing the packing of the first embodiment and an upper spacer and a lower spacer with which both ends of the packing are provided.

FIG. 8(A) is a perspective view seen from the back side of the connector terminal 20C representing the packing 30 of the first embodiment, and FIG. 8(B) is a perspective view seen from the back side of the connector terminal 20C representing the packing 30 of the first embodiment and the upper spacer 40U and the lower spacer 40S with which both ends of the packing 30 are provided. Both of the upper spacer 40U and the lower spacer 40S have the same shape made of the same material, and have an oval shape in plan view and have the shape in which a hole through which the connector terminal 20C extends is bored in the center.

<Function of Spacer of Second Embodiment>

Figure 9:
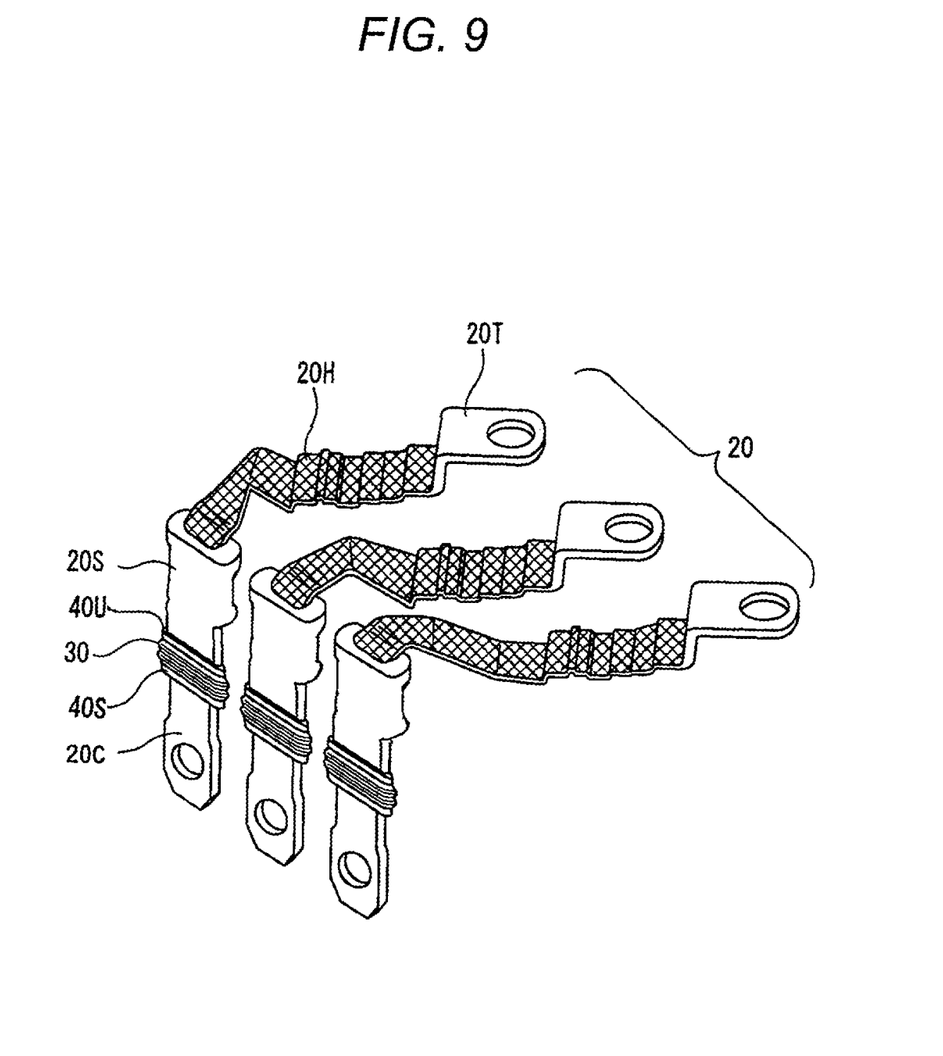
FIG. 9 is a perspective view of an electric conductor in which the upper spacer and the lower spacer are attached to both upper and lower ends of each packing of the electric conductor of FIG. 1(A).

FIG. 9 is an electric conductor of the inverter side in which the upper spacer 40U and the lower spacer 40S are attached to both upper and lower ends of each packing 30 (FIG. 1(A)) of the first embodiment.

In FIG. 9, electric conductors 20 are the electric conductors of three systems for supplying an AC three-phase current produced in the inverter side to the motor side, and each of the electric conductors includes an inverter side connecting terminal 20T, a braid 20H whose one end is connected to the inverter side connecting terminal 20T, and a connector terminal 20C having a caulked part 20S in which the other end of the braid 20H is caulked. Then, the packing 30 according to the first embodiment of the invention for surrounding the connector terminal 20C and the upper spacer 40U and the lower spacer 40S according to the second embodiment are attached to the connector terminal 20C.

Figure 10:
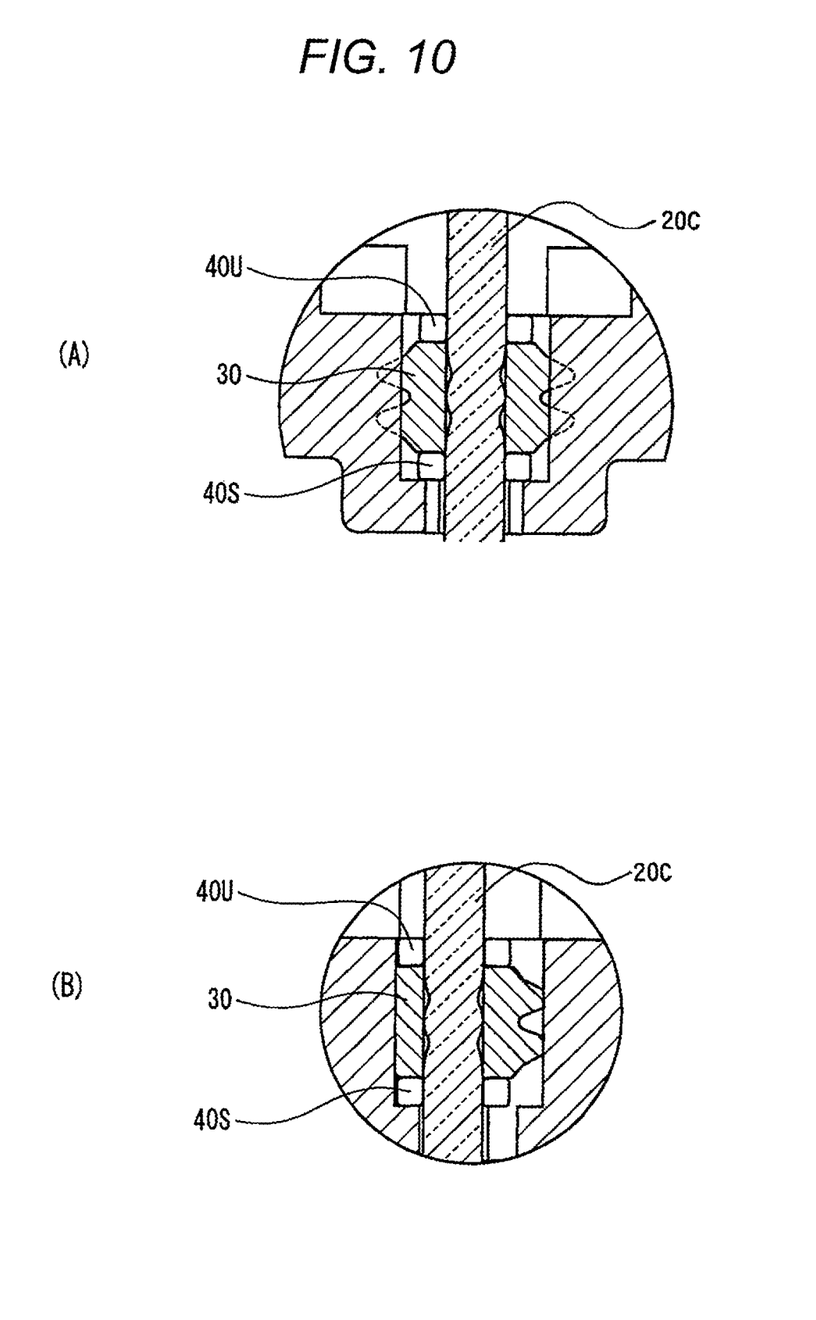
FIG. 10(A) shows a state of the packing at the time of no vibration.
FIG. 10(B) represents a deformed state of the packing at the time of vibration. In addition.

FIGS. 10(A) and 10(B) are sectional views describing a function of such upper and lower spacers 40U, 40S, and FIG. 10(A) shows a state of the packing 30 at the time of no vibration, and FIG. 10(B) represents a deformed state of each packing 30 at the time of vibration.

Figure 7:
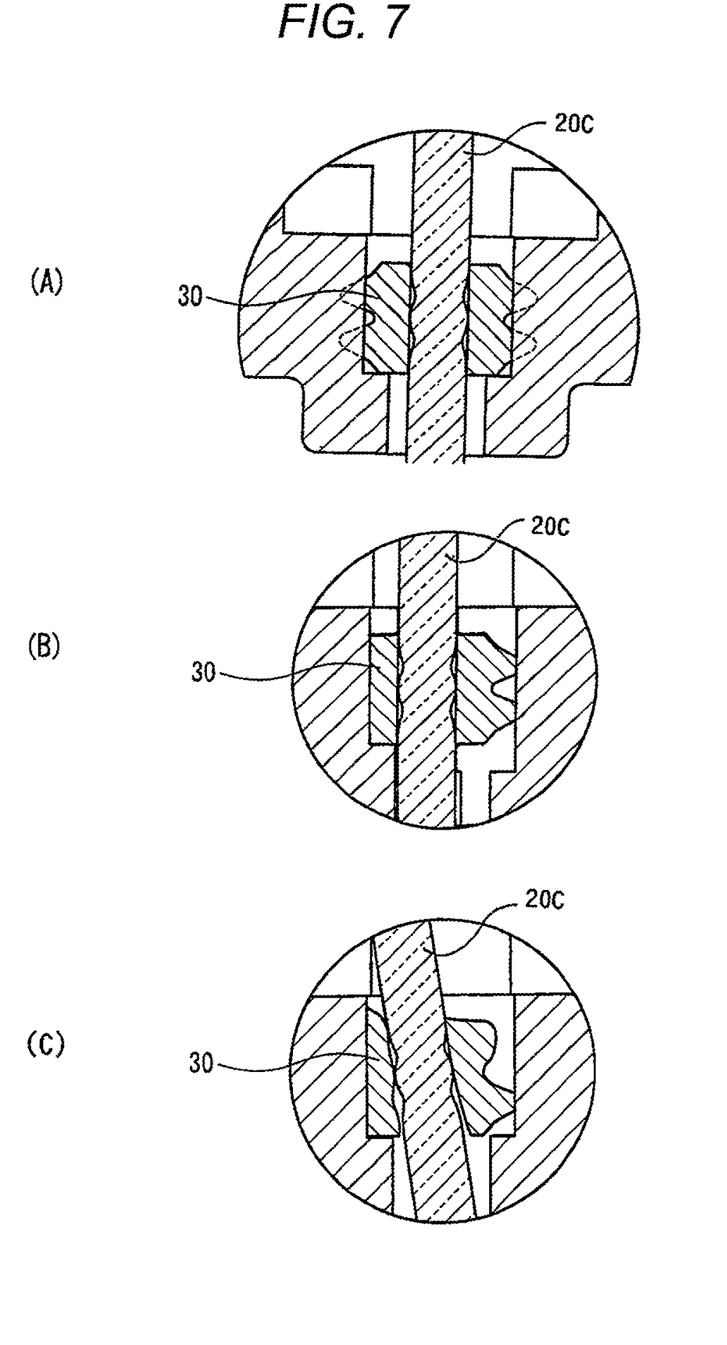
FIG. 7(A) shows a state of the packing at the time of no vibration.
FIG. 7(B) shows a state of the packing at the time when a connector terminal is displaced by vibration while maintaining a vertical state.
FIG. 7(C) represents a deformed state of each packing at the time when the connector terminal is inclined by vibration. In addition.

At the time of no vibration of FIG. 10(A), the packing 30 is in contact with a contact surface of the entire periphery, so that the packing function is fulfilled without any problem. At the time of vibration of FIG. 10(B), even when the connector terminal 20C attempts to be displaced and inclined in the hole, upper and lower portions of the connector terminal 20C are regulated by the upper and lower spacers 40U, 40S, so that the connector terminal 20C is forced to be displaced while maintaining the vertical state and therefore, the packing 30 is in contact with the contact surface of the entire periphery as shown in the drawing and the connector terminal 20C is not inclined as shown FIG. 7(0), so that the packing function can be fulfilled without any problem.

<Sub-Function of Spacer of Second Embodiment>

Also, since the packing 30 is sandwiched between the upper and lower spacers 40U, 40S, the role of a guide in the case of attaching the packing 30 to the connector terminal 20C is also played, so that workability improves.

When only the packing 30 is attached to the connector terminal 20C without the upper and lower spacers 40U, 40S, the packing 30 turns, so that workability reduces remarkably.

<Effect of Upper and Lower Spacers 40U, 40S of Second Embodiment>

By providing both ends of the packing 30 with the upper and lower spacers 40U, 40S of the second embodiment of the invention, the connector terminal 200 is displaced while maintaining the vertical state by the upper and lower spacers 40U, 40S even when large relative movement occurs between the inverter and the motor and the connector terminal 20C attempts to be inclined, so that the second embodiment can obtain an effect in which the packing 30 of the first embodiment can continue to fulfill the packing function without any problem.

The present application is based on Japanese patent application (patent application No. 2009-255288) filed on Nov. 6, 2009, and the contents of the patent application are hereby incorporated by reference.

DESCRIPTION OF REFERENCE NUMERALS AND SIGNS

10 INVERTER TERMINAL BOARD
100 CONNECTOR TERMINAL INSERTION PORT
10H BRAID RECEIVING PART
10T TERMINAL RECEIVING PART
20 ELECTRIC CONDUCTOR
20C CONNECTOR TERMINAL
20H BRAID
20S CAULKED PART
20T INVERTER SIDE CONNECTING TERMINAL
30 PACKING
30A THIN-WALL PORTION
30B THICK-WALL PORTION
40S LOWER SPACER
40U UPPER SPACER
100 MOTOR CASE
100C POWER RECEIVING BOX
100T MOTOR SIDE TERMINAL
200 INVERTER
200T OUTPUT TERMINAL

The invention claimed is:
1. An inverter terminal board, comprising:
an electric conductor which has an inverter side connecting terminal connected to an output terminal of an inverter attached to a case of a motor and a connector terminal for supplying power to a power receiving terminal of the motor, the electric conductor being made by connecting the inverter side connecting terminal to the connector terminal, wherein the connector terminal has a flat plate shape, and a packing having an oval ring shape and having a single through hole with packing portions circumscribing the through hole, the connector terminal being received in the through hole such that the packing portions are attached to the connector terminal over an entire periphery of the connector terminal, wherein a wall thickness of the packing portions abutting on flat plate sides of the flat plate-shaped terminal in the entire periphery of the packing is made thicker than a wall thickness of the other packing portions, wherein the packing portions abutting on the flat plate sides have a uniform cross-section along a direction parallel to the flat plate sides, and wherein in the packing, two or more adjacent first chevron parts are formed outside and two or more adjacent second chevron parts are formed inside, in longitudinal sectional view.

2. The inverter terminal board as claimed in claim 1, wherein both ends of the packing attached to the connector terminal are provided with spacers.

3. A packing for an inverter terminal board, whose external shape is an oval cylindrical ring shape, the packing comprising a single through hole passing through the center of the oval cylinder and extending in a long axis direction, the packing having packing portions circumscribing the through hole;

wherein a wall thickness of packing portions of surfaces parallel to a long axis side in the entire periphery of the packing is made thicker than a wall thickness of packing portions of the other surfaces, wherein the packing portions of the surfaces parallel to the long axis side have a uniform cross-section with respect to the long axis direction, and wherein two or more adjacent first chevron parts are formed outside and two or more adjacent second chevron parts are formed inside, over the entire periphery of the packing.

* * * * *